United States Patent Office 3,434,147
Patented Mar. 18, 1969

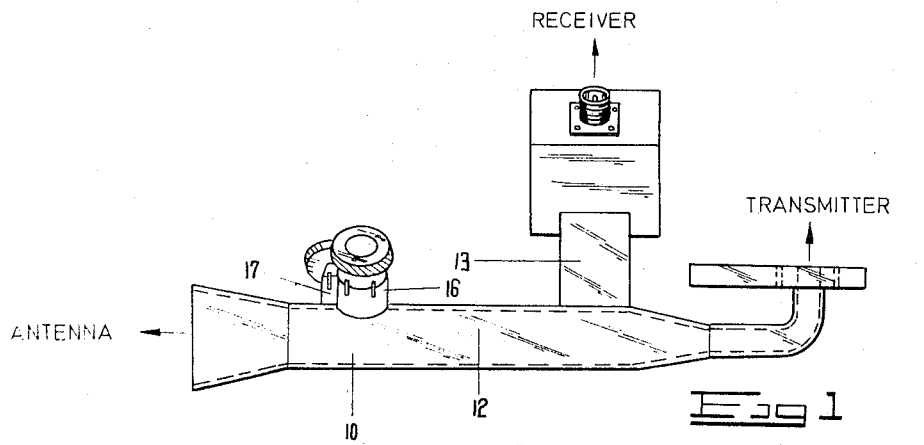
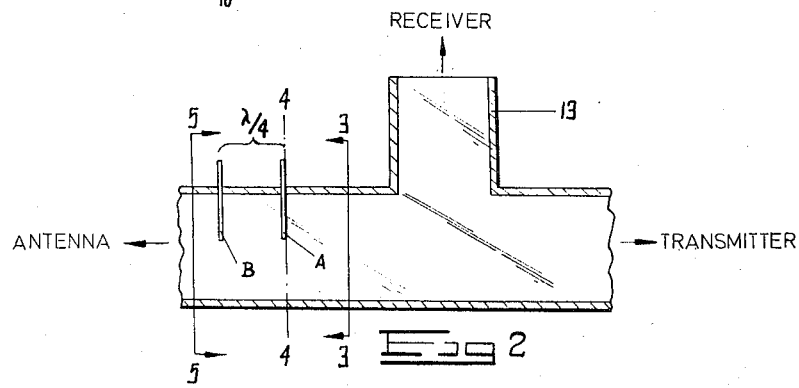
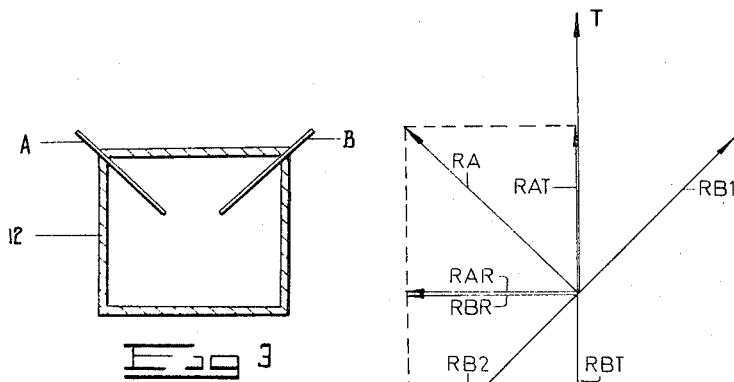
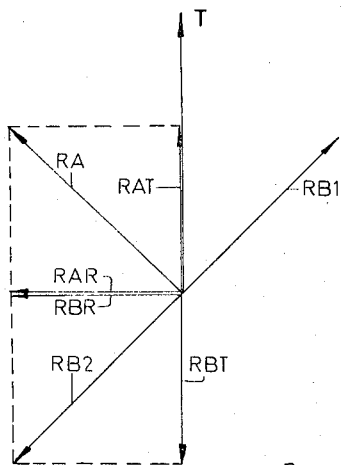
INVENTORS
PAUL J. CABION
JULES A. FEJER

3,434,147
ANTENNA FEED WITH POLARIZATION SELECTIVITY
Paul J. Cabion, Johannesburg, Transvaal, Republic of South Africa, and Jules A. Fejer, Dallas, Tex., assignors to South African Inventions Development Corporation
Filed Aug. 8, 1966, Ser. No. 571,001
Claims priority, application Republic of South Africa, Sept. 3, 1965, 65/4,817
U.S. Cl. 343—756        10 Claims
Int. Cl. H01q 19/00, 13/00; H01p 5/12

This invention relates to microwave transmission apparatus. More particularly it relates to microwave transmission apparatus for use in electronic distance-measuring systems.

In such systems a first radiation is transmitted from a first point to a remote point. A second radiation is received at the first point from the remote point. At the first point a sample of the first radiation is compared with the received second radiation.

This invention is particularly concerned with the manner of obtaining a sample of the first radiation at the first point and its object is to provide a microwave transmission apparatus in which certain unwanted reflections in the apparatus are eliminated in a novel manner.

A microwave transmission apparatus according to the invention includes a first waveguide adapted to propagate a first microwave radiation from a transmitter to an antenna and comprising an input section and an output section, a second waveguide connected to the first waveguide at the junction of the input section and the output section, means to prevent microwave radiation polarized in a first prescribed plane from passing through the input section, means to prevent microwave radiation polarized in a second prescribed plane from passing through the second waveguide, the output section being adapted to propagate microwave radiations polarized in at least the first and second prescribed planes, and formations protruding into the output section and adapted to re-radiate a portion of the first microwave radiation back towards the input section such that the re-radiated portion is polarized in the first prescribed plane only.

Further according to the invention the first microwave radiation is arranged to be polarized in the second prescribed plane.

Further according to the invention the formations comprise two probes or the like spaced a quarter wavelength apart in the direction of propagation of the first microwave radiation, each probe being arranged to define with the second prescribed plane of polarization, an angle of substantially 45 degrees.

To illustrate the invention an embodiment thereof is described hereunder with reference to the accompanying drawings in which:

FIGURE 1 shows a side view of a waveguide assembly for use in the invention,

FIGURE 2 is a diagrammatic sectional elevation of the assembly,

Figure 5:
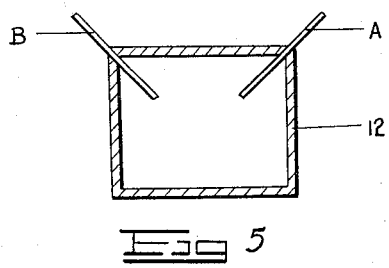
Figure 6:
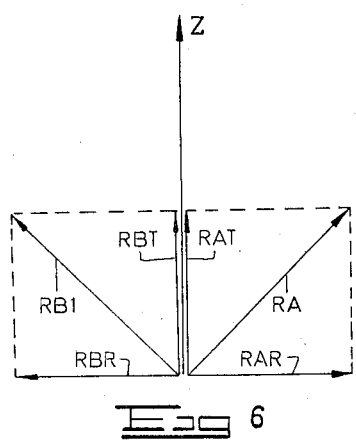
Figure 7:
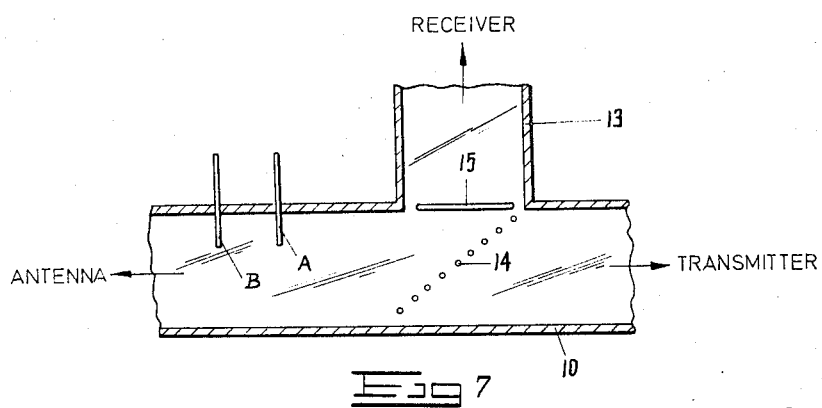

FIGURE 3 is a diagrammatic cross-sectional elevation of the assembly along the line 3—3 in FIGURE 2, FIGURE 4 is a vector diagram showing one set of space vectors at line 4—4 in FIGURE 2, FIGURE 5 is a diagrammatic cross-sectional elevation of the assembly along the line 5—5 in FIGURE 2, FIGURE 6 is a vector diagram showing another set of space vectors at line 4—4 in FIGURE 2, and FIGURE 7 is a diagrammatic sectional elevation similar to FIGURE 2 of the waveguide assembly showing the position of the grids.

The waveguide assembly to be described hereunder is intended to be used in conventional electronic distance measuring equipment employing microwaves. In particular, the assembly is intended to be incorporated in a "Master" station from which a first microwave radiation is transmitted to a "Slave" station. A second microwave radiation is transmitted from the slave station to the master station where the received radiation is compared with a sample of the outgoing radiation to give phase information relating to the distance between the stations.

In FIGURE 1 a first waveguide 10 is adapted to feed the first microwave radiation from a transmitter (not shown) to an antenna (not shown). This first radiation is arranged to be polarized in a vertical plane, which, for the sake of clarity, will hereinafter be referred to as the transmitted plane. The waveguide 10 comprises an input section 11, which is rectangular in cross-section, and an output section 12, which is square in cross-section. A second waveguide 13, which is rectangular in cross-section, is connected to the first waveguide 10 at the junction of the input and the output sections.

The antenna of the master station is also arranged to receive the second microwave radiation from the slave station. This second radiation is arranged to be polarized in a plane which is perpendicular to the transmitted plane. The plane of the second radiation will, for the sake of clarity, hereinafter be referred to as the received plane.

One of the first requirements in the assembly of the invention is that radiation polarized in the transmitted plane must be able to pass through the waveguide 10 to the antenna but must not be able to pass through the second waveguide 13 to the receiver. Furthermore radiation polarized in the received plane must be able to pass from the antenna through the output section 12 and the second waveguide 13 to the receiver but must not be able to pass through the input section 11 to the transmitter. These problems are resolved by means of two grids the arrangement of which is illustrated in FIGURE 7.

A grid 14 which is transparent to radiation polarized in the transmitted plane but opaque to radiation polarized in the received plane, is positioned across the first waveguide 10 at the junction of the input and the output sections. A second grid 15 which is transparent to radiation polarized in the received plane but opaque to radiation polarized in the transmitted plane, is positioned across the entrance of the second waveguide 13. The construction of such grids is well-known in the microwave field and will not therefore be elaborated upon.

As can be seen from FIGURE 7 the grid 14 is tilted over at an angle with respect to the longitudinal axis of the first waveguide 10. The purpose of this is to ensure that radiation polarized in the received plane is matched to the receiver. The grid 15 is arranged to form part of the top wall of the waveguide 10 to ensure that radiation polarized in the transmitted plane is matched to the antenna.

The next requirement in the assembly of the invention is that a sample of the transmitted radiation must be extracted for it to be compared with the received radiation. This requirement is provided for by the construction illustrated in FIGURES 1 and 2.

Two probes A and B are arranged to protrude into the output section of the waveguide 10. The probes are mounted in housings 16 and 17 respectively and employ quarter wave co-axial transformers to obtain a good connection to the corners of the waveguide.

The probes A and B are spaced a quarter wavelength apart in the direction of propagation of the first radiation and the probe B is nearer to the antenna than the probe A. Furthermore each probe is inclined to the vertical to subtend therewith an angle of 45 degrees. In other words each probe subtends with the transmitted plane of polarization, at an angle of 45 degrees.

FIGURE 3 shows a diagrammatic cross-sectional elevation of the waveguide 10 along the line 3—3 and looking in the direction of the antenna from which it will be noticed that the probes are mounted on either side of the longitudinal axis of the waveguide 10.

As the first radiation passes the probes a portion of the radiation is re-radiated from each probe. Some of this re-radiated radiation is propagated in the direction of the antenna and some is propagated in the direction of the transmitter. The latter re-radiated radiation is used to provide the necessary sample and the manner in which it is done is illustrated in the vector diagram shown in FIGURE 4. The vectors shown in this diagram represent the position at line 4—4 in FIGURE 2.

The transmitted plane of polarization is designated by the vector T. The portion of the first radiation which is re-radiated by the probe A towards the transmitter is designated by the vector RA.

The direction of the vector RA will of course be parallel to the probe A. The vector RA can be split into two components, RAT which lies in the transmitted plane, and RAR which lies in the received plane. The portion of the first radiation which is re-radiated by the probe B towards the transmitter is designated by the vector RB1. The direction of this vector will of course be parallel to the probe B. However since the vector diagram represents the situation at line 4—4 the true position of vector RB1 will be as designated by the vector RB2. The reason for this is that the first radiation, in traveling from the probe A to the probe B and being re-radiated from the probe B to the probe A, will have undergone a phase change of two quarter wavelengths i.e. 180 degrees. This vector RB2 can also be split into two components: RBT in the transmitted plane and RBR in the received plane.

As can be seen from FIGURE 4 the vectors RAT RBT are equal and opposite. The reason for this is that substantially the same amount of the first radiation is re-radiated from each of the probes. There is therefore no resultant re-radiated radiation in the transmitted plane and the only resultant re-radiated radiation, namely RAR plus RBR, lies in the received plane. Thus, because of the grids 14 and 15, the re-radiated radiation can only pass through the second waveguide 13 to the receiver and cannot pass through the input section 11 to missmatch the transmitter. This then is one of the features of the invention, that a portion of the first radiation is re-radiated back by the probes and that the portion is polarized in the received plane whereas the first radiation is polarized in the transmitted plane.

It could happen that a portion of the first radiation is reflected back from the antenna. This portion would of course be polarized in the transmitted plane and, because of the grid 15, the portion would not be able to pass to the receiver. What is more serious however is that this reflected radiation would in turn cause the probes to re-radiate and this re-radiation could pass to the receiver and affect the accuracy of the distance measurement. It is another feature of the invention however that such an event could not occur and the following description (which refers to FIGURES 5 and 6) will show why.

FIGURE 5 shows a diagrammatic cross-sectional elevation of the waveguide 10 along the line 5—5 in FIGURE 2 and looking in the direction of the transmitter. FIGURE 6 is a vector diagram showing another set of space vectors at the line 4—4 in FIGURE 2.

In FIGURE 6 the vector represents that portion of the first radiation which is reflected back from the antenna. As mentioned above this portion is polarized in the transmitted plane.

Vectors RB1 and RA represent the re-radiations from the probes B and A respectively due to the reflected portion. As in FIGURE 4 these vectors can again be split up into their components in the transmitted and received planes. Thus the vector RB1 has the components RBT in the transmitted plane and RBR in the received plane and the vector RA has the components RAT in the transmitted plane and RAR in the received plane. In this case however the vectors RBR and RAR are equal and opposite so that the only resultant re-radiation from the probes, due to the reflected portion, is polarized in the transmitted plane and it cannot therefore pass to the receiver. It should be noted that in this case the vector RB1 is not displaced through 180 degrees.

Finally it should be mentioned that the penetration of the probes A and B into the waveguide 10 may be adjustable to vary the portion of the first radiation which is extracted and fed into the receiver.

We claim:
1. A microwave transmission apparatus including a first waveguide adapted to pass a first microwave radiation from a transmitter to an antenna and comprising an input section and an output section, a second waveguide connected to the first waveguide at the junction of the input and the output sections, means to prevent microwave radiation polarized in a first prescribed plane from passing through the input section, means to prevent microwave radiation polarized in a second prescribed plane from passing through the second waveguide, the output section being adapted to pass microwave radiations polarized in at least the first and the second prescribed planes, and formations protruding into the output section and adapted to re-radiate a portion of the first microwave radiation back towards the input section such that the re-radiated portion is polarized in the first prescribed plane only.

2. Apparatus as claimed in claim 1 in which the first microwave radiation is polarized in the second prescribed plane.

3. Apparatus as claimed in claim 1 in which the formations consist of two probes spaced a quarter wavelength apart in the direction of the propagation of the first microwave radiation.

4. Apparatus as claimed in claim 3 in which at least those portions of the probes protruding into the output section converge towards each other and the two probes are mounted on either side of the longitudinal axis of the output section.

5. Apparatus as claimed in claim 4 in which each probe defines with the second prescribed plane of polarization an angle of substantially 45 degrees.

6. A microwave transmission apparatus including a first waveguide adapted to pass a first microwave radiation from a transmitter to an antenna and comprising an input section, a second waveguide connected to the first waveguide at the junction of the input and the output sections, a grid in the input section which is opaque to microwave radiation polarized in a first prescribed plane and transparent to microwave radiation polarized in a second prescribed plane to prevent the former radiation from passing through the input section and to allow the latter radiation to pass through the input section, another grid in the second waveguide which is opaque to microwave radiation polarized in the second prescribed plane and transparent to microwave radiation polarized in the first prescribed plane to prevent the former radiation from passing through the second waveguide and to allow the latter radiation to pass through the second waveguide, the output section being adapted to pass radiations polarized in at least the first and second planes, and formations protruding into the output section and adapted to re-radiate a portion of the first microwave radiation back towards the input section such that the re-radiated portion is polarized in the first prescribed plane only.

7. Apparatus as claimed in claim 6 in which the first microwave radiation is polarized in the second prescribed plane.

8. Apparatus as claimed in claim 6 in which the formations consist of two probes spaced a quarter wavelength apart in the direction of propagation of the first microwave radiation.

9. Apparaatus as claimed in claim 8 in which at least those portion of the probes protruding into the output section converge towards each other and the two probes are mounted on either side of the longitudinal axis of the output section.

10. Apparatus as claimed in claim 9 in which each probe defines with the second prescribed plane of polarization an angle of substantially 45 degrees.

References Cited

UNITED STATES PATENTS 3,162,828  12/1964  Schmidt et al. _____ 333—6

ELI LIEBERMAN, *Primary Examiner.*

MARVIN NUSSBAUM, *Assistant Examiner.*

U.S. Cl. X.R.

333—7, 21, 98; 343—786